Feb. 18, 1941.  G. HAGEDORN  2,232,450
METHOD AND APPARATUS FOR RESISTANCE WELDING
Filed Nov. 15, 1938  4 Sheets-Sheet 2

G. Hagedorn
Inventor
By Glascock Downing & Seebold
Attys.

Feb. 18, 1941. G. HAGEDORN 2,232,450
METHOD AND APPARATUS FOR RESISTANCE WELDING
Filed Nov. 15, 1938 4 Sheets-Sheet 3

G. Hagedorn
Inventor
By: Glascock Downing & Seebold
Attys.

Feb. 18, 1941.  G. HAGEDORN  2,232,450
METHOD AND APPARATUS FOR RESISTANCE WELDING
Filed Nov. 15, 1938  4 Sheets-Sheet 4

G. Hagedorn
Inventor

By: Glascock Downing & Seebold
Attys.

Patented Feb. 18, 1941

2,232,450

UNITED STATES PATENT OFFICE 2,232,450

METHOD AND APPARATUS FOR RESISTANCE WELDING

Gerhard Hagedorn, Berlin-Halensee, Germany, assignor to Bernhard Berghaus, Berlin-Lankwitz, Germany Application November 15, 1938, Serial No. 240,578
In Germany November 29, 1937

7 Claims. (Cl. 219—4)

The present invention relates to electric resistance welding and more particularly pertains to methods and means for reducing the transverse currents in the material to be welded.

It is known to carry out resistance double spot welding by so disposing on each side of the weld material a transformer with two adjacently situated electrodes that the electrodes coincide. In the known device the secondary sides are connected in series and the welding current flows in the circuit formed by the two transformer windings, the electrodes and the metal sheets. The transverse currents which flow from one electrode to the other of the same transformer within the weld material do not completely annul one another, although they are opposed to one another, owing to the transference resistances between the metal sheets. These transverse currents not only represent a loss but, particularly in the case of small electrode distances, result in damage of the sheet metal surface under the electrode edges turned to one another. These drawbacks are removed by the present invention.

The present invention relates to a resistance, spot or seam welding process in which on each side of the weld material a welding transformer is used with at least two electrodes, the primary windings being at tensions of the same frequency and phase or being fed in series or parallel connection from the same current source, the secondary windings being connected in series and the electrode pairs being in coinciding opposition to one another, which is distinguished by the fact that two high frequency welding transformers are used which are fed by a high frequency current.

More particularly frequencies between 1000 and 20,000 cycles have proved to be satisfactory. Since the effective resistances even at these frequencies play no subsidiary role as compared with the reactances, this expedient has as a consequence that on account of the current displacement effect the transverse effective resistance of the sheet metal rises strongly, for at the frequencies used the current flows practically only in a thin layer at the surface. In contradistinction thereto the rise in the effective resistance of the weld place due to the current displacement is considerably less on account of the transition resistance from sheet to sheet. The resistance ratio is therefore more favourable and the current loss only small as compared with the welding current. The process, therefore, not only affords a particularly high degree of efficiency, such as is attained in no other welding process, but also yields fault-free welds. The new process is very advantageous particularly in the welding of metals with low resistance, such as copper, aluminium and so forth, since then the current displacement is particularly noticeable (small penetration depth). The process can also be used with advantage for single spot welding if the one electrode pair is provided so large that the current density is no longer sufficient for welding. Instead of electrode rods rollers may also be provided for seam welding.

The invention also relates to a resistance spot or seam welding process in which a welding transformer with at least two electrodes is used on each side of the weld material, the primary windings being at tensions of the same frequency and phase or being fed in series or parallel connection from the same current source. The secondary windings are connected in series and the electrode pairs are disposed in coinciding opposition to one another, and two high frequency welding transformers are used which are fed by a high frequency current, preferably of 1000 to 20,000 cycles per second, and the transverse current part flowing in the proximity of the surface of each of the two sheets to be welded together is reduced in proportion to the transverse current part flowing in the interior of the sheet by electromagnetically inductively acting current displacement means, and consequently the metal sheet surface is not loaded so much by the transverse currents and is obtained in satisfactory and uninjured condition.

According to the invention bulk or subdivided iron may be inserted between the electrodes. Further it has been found to be particularly favourable if the primary or secondary welding current produces the magnetic field for displacing the transverse current.

The invention further relates to an apparatus for carrying out the process described which is distinguished by an electromagnet between the electrodes. The apparatus can also be constructed so that the transformer iron of the welding transformer at the same time forms the iron inserted between the electrodes. Medium or high frequency welding transformers are used since the current displacement effects increase with the frequency. In accordance with the invention a displacement current conductor disposed on the surface of the weld material or arranged at a small distance away may be so constructed that the two weld electrodes pass through it and that it extends approximately over the whole region of the weld current flowing in the upper weld material. The displacement current conductor is advantageously connected in parallel to the electrode current leads. One of the leads takes the form of a loop for the purpose of current regulation. In the current regulating loop a subdivided iron core is displaceably arranged for regulating the apparent resistance of the loop. There may also be a regulable ohmic resistance connected up in the current regulating loop. The current flowing in the displacement current conductor must as far as possible be of the same phase or of the same momentary direction as the weld current. The electrical conductivity value of the material of which the preferably plate-shaped displacement current conductor consists is chosen accordingly. Further the plate of the current displacement conductor consists of a magnetic material, when magnetic material is to be welded. The current displacement conductor and the weld material are advantageously fed with an alternating current of 1,000 to 20,000 cycles per second, more particularly 5,000 to 8,000 cycles per second. Each welding transformer may according to the invention also at the same time form the electromagnets for the current displacement, in such a way that a leg of the iron core of the double spot welding transformer is arranged between the two electrodes in the proximity of the weld material and at this place there is an air gap so that its main magnet field penetrates the loop formed by both electrodes and the weld material.

One thousand to twenty thousand cycles per second are used here also. It is particularly advantageous to provide the double spot welding transformer with two further exterior magnetic fields opposed to the main magnetic field flowing within the electrodes. Then for example two three-membered cores are disposed at a certain distance apart with their pole surfaces opposite one another and the electrodes are arranged in the air gap between the middle and outer core. Preferably a shell-type transformer is used with air gap. The electrodes are arranged in the air gap between the middle and outer core. Further the welding transformer may be so constructed that its primary winding serves for the current displacement out of the upper surface of the weld material. It is particularly favourable to form the primary winding as a winding in sections or discs and to extend it forward somewhat out of the secondary winding at the side turned towards the weld material, the connecting ends of the secondary winding being crossed, so that the current in the weld material and in the primary winding shows approximately the same direction. This double spot welding transformer also is for the said reasons fed with alternating current of a frequency higher than the usual technical frequency advantageously with 1,000 to 20,000 cycles per second.

Eight examples of the invention are given schematically in the accompanying drawings, in which Figure 1 shows schematically a section through a resistance spot or weld apparatus in which on each side of the weld material a welding transformer is used having at least two electrodes.

Figure 3 is a section through resistance double spot welding apparatus in which the secondary welding current produces the magnetic field for displacing the transverse currents;

Figure 1:
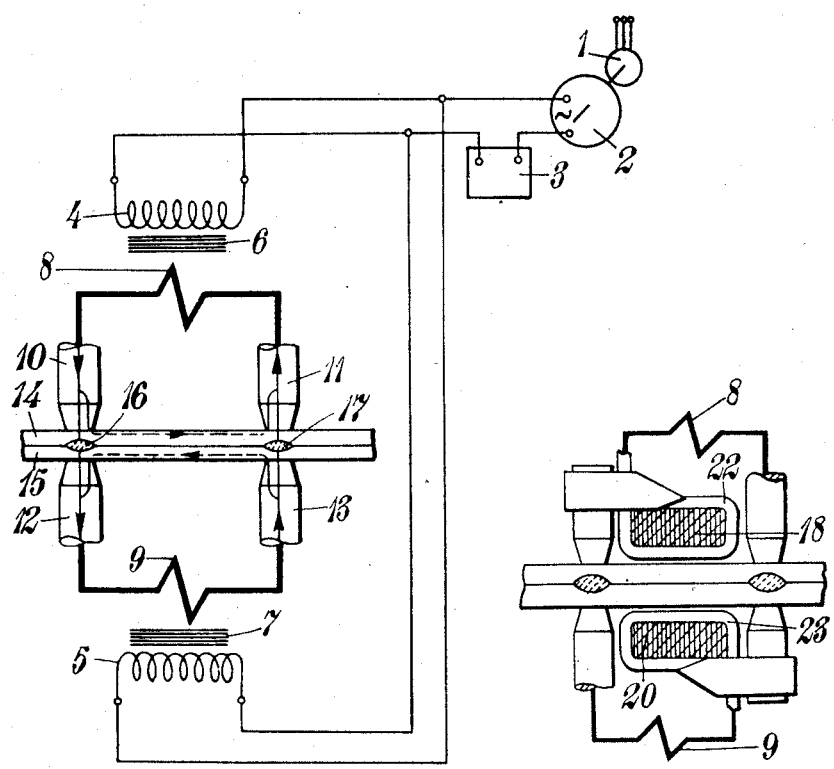

Figure 1 shows a resistance double spot welding arrangement. The motor 1 drives the high frequency welding generator 2 of for example 8,000 cycles which feeds the primary windings 4 and 5 of two high frequency double spot welding transformers 6 and 7. The secondary windings 8 and 9 of the transformer are connected to the double spot electrodes 10 and 11, 12 and 13. The sheets to be welded together are indictaed at 14 and 15 and the two weld spots are 16 and 17. The current supplied to the primary windings of the transformers may be controlled by a switch 3.

Figure 2:
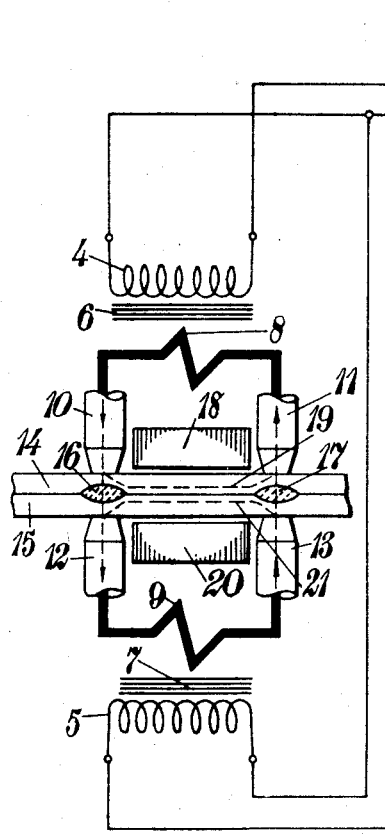
Figure 2 shows similar apparatus in which two pieces of iron are arranged between the electrodes.

In the double spot welding arrangement according to Figure 2 the motor 1 drives the high frequency welding generator 2 of for example 8,000 cycles per second, which feeds the primary windings 4 and 5 of two high frequency double spot welding transformers 6 and 7. The secondary windings 8 and 9 of these transformers are connected to the double spot electrodes 10 and 11, 12 and 13. The parts 14 and 15 are the metal sheets to be welded are connected by the two weld spots 16 and 17. Between the electrodes 10 and 11, 12 and 13 a bulk or subdivided iron piece 18, 20 is arranged according to the invention in order to displace the transverse currents from the surface as indicated at 19 and 21.

The double spot welding apparatus according to Figure 3 differs from that shown in Figure 2 by the fact that the secondary welding current produces the magnetic field for displacing the transverse current, the secondary coils 8, 9 of the transformers forming a loop 22, 23 around the iron cores 18, 20.

Figure 4:
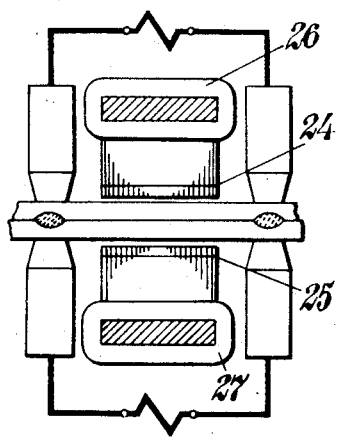
Figures 4 and 5 are sections through resistance double spot welding apparatus with a current displacement electromagnet between the electrodes.
Figure 5:
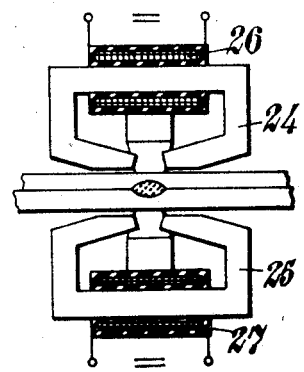

Figures 4 and 5 show an arrangement of electromagnets 24 and 25 with the exciter coils 26, 27 between the electrodes. Through the air gap between the poles a powerful stray field acts in the outer metal sheet which likewise, if the phase is correct, supplements the transverse current displacement. The field must act as far as possible tangentially to the sheet metal surface.

Figure 6:
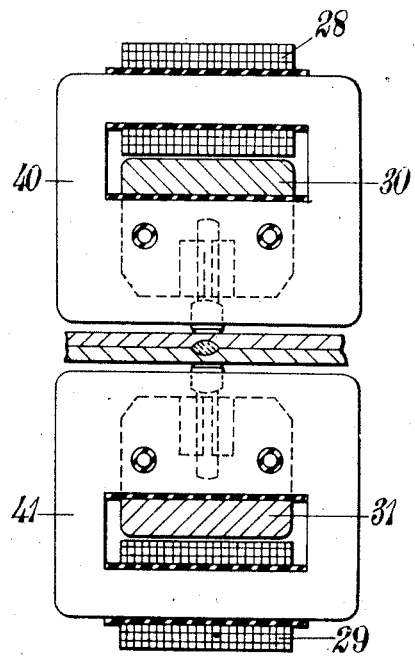
Figures 6 and 7 are sections through resistance double spot welding apparatus in which the transformer iron of the welding transformer at the same time forms the iron inserted between the electrodes.
Figure 7:
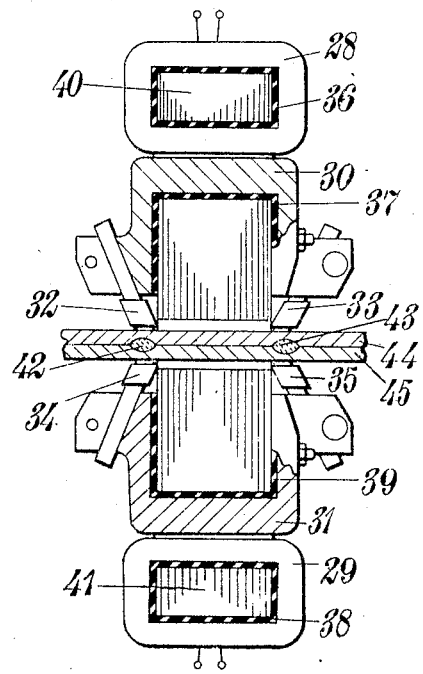
Figure 9:
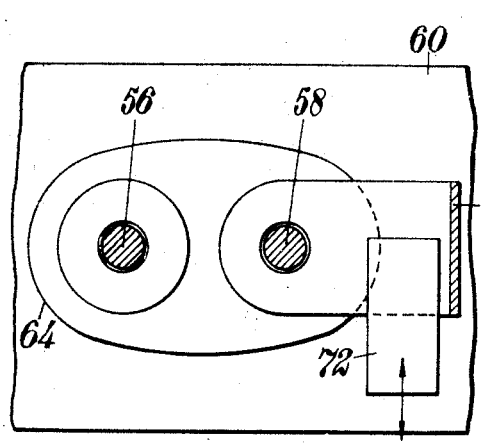

In Figures 6 and 7 the parts 28 and 29 are the primary windings, and the parts 30 and 31 are the secondary windings connected respectively to the electrodes 32 and 33, 34 and 35; the parts 36, 37 and 38, 39 are insulating bodies and the parts 40 and 41 are the iron cores of the transformers which are preferably made thicker on the side adjacent to the weld material so that the magnetic flux in the iron originating from the weld current has a low resistance offered to it. The electrodes project only a little beyond the iron cores. Owing to the lop-sided form of the magnetic field of the weld current this displaces itself, and in fact away from the iron. 42 and 43 indicate the two weld spots which unite the sheets 44 and 45.

In Figures 8 and 9, 46, 47 are synchronously operating alternating current sources of the same frequency and phase of 1,000 to 20,000, preferably 5,000 to 8,000 cycles per second, which by way of a switch feed the high frequency welding transformers 48, 49, the secondary coils 50, 51 of which are connected with the holders 52, 54 and 53, 55 for the welding electrodes 56, 58 and 57, 59. The parts 60 and 61 represent the parts to be welded, for example two metal sheets, which are connected together by means of the weld points 62 and 63. The displacement current conductor 64, 65 lying on, or adjoining, the weld material 60, 61, is constructed so that it completely surrounds at a small distance the two welding electrodes 56, 57 and 58, 59 for example as a plate provided with two holes, and so that it extends approximately over the whole region of the weld current flowing in the upper weld material. The displacement current conductor is connected to the one electrode holder 52, 54 by means of part 66, 68, and is connected by way of part 67, 69, as well as a current regulating loop 70, 71 to the holder 53, 55, of the other electrode. The part 74, 75 represents insulation. In the current regulating loop 70, 71 there is a massive or subdivided iron core 72, 73 displaceably arranged for regulating the apparent resistance of the loop. The displacement plate may also be connected in series with the secondary winding of the transformer.

Figures 8, 11:
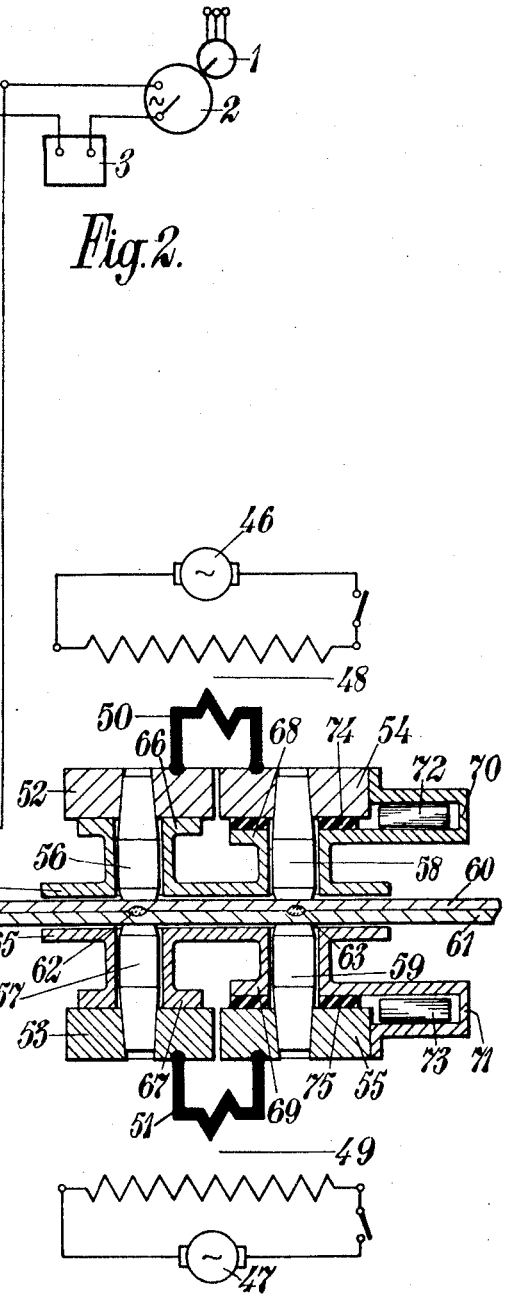
Figures 8 and 9 are sectional views of resistance double spot welding apparatus in which a displacement current conductor is disposed adjacent each weld material surface.
Figures 10 and 11 are sections through resistance double spot welding apparatus in which each welding transformer at the same time forms the electromagnet for the current displacement.
Figure 10:
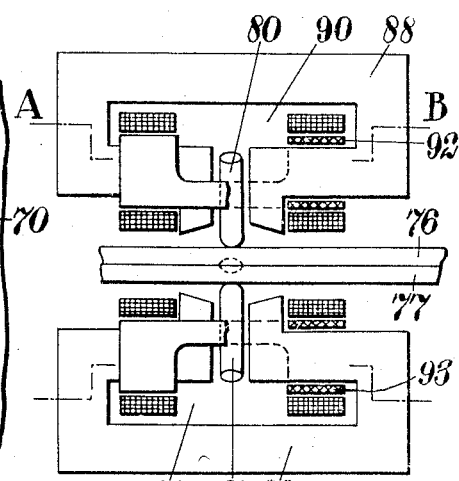

In Figures 10 and 11 the parts 76 and 77 are the two metal sheets to be welded which are joined by the weld spots 78 and 79. The welding electrodes 80, 82 and 81, 83 are connected with the secondary coil 84, 85 of the welding transformers. The parts 86, 87 represent the primary windings of the welding transformers, the iron cores 88, 89 of which possess an air gap 90, 91 in which the electrodes are arranged. The parts 92, 93 are insulating bodies. The shape of the pole pieces is advantageously so chosen that the magnetic transformer main field passing over from pole to pole passes through the weld material as far as possible flat or tangentially. The weld current then flows so that it includes as many main field lines as possible, that is to say it flows advantageously in the outer zones of the electrodes and in the middle zones of the sheet.

The further advantage is also obtained that the self-induction of the conductor loop formed of electrodes and weld material is compensated to an extensive degree, which particularly in the case of high frequency, considerably reduces the secondary apparent output of the transformer and consequently has a considerable effect on the size of the latter.

Figure 12:
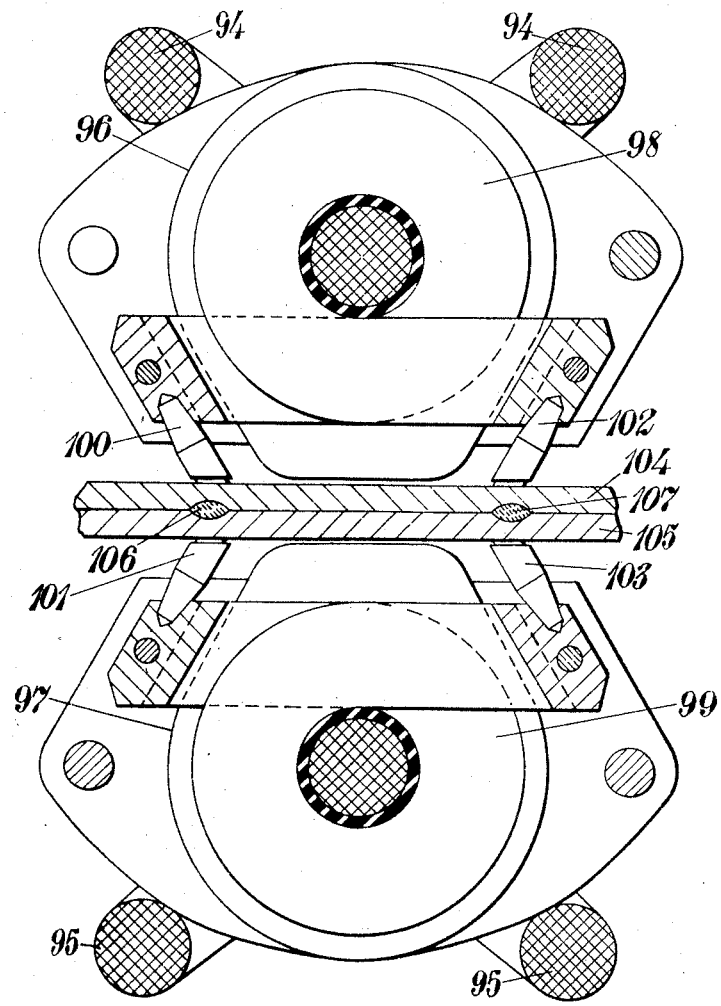
Figure 12 is a section through resistance double spot welding appaartus in which the primary winding of the double spot welding transformer serves for displacing the current.

In Figure 12, the iron cores of the transformers, e. g. of iron wire or even of sheet metal, are represented by 94, 95. The forwardly extended flat-shaped primary windings of the transformers serving for current displacement are indicated by 96, 97, and 98, 99 represent the crossed secondary windings of the transformers, the ends of which are connected with the welding electrodes 100, 102, and 101, 103. 104 and 105 are two metal sheets to be welded and 106 and 107 are the two weld spots.

What I claim is:

1. A method of welding material wherein two spaced welding electrodes are arranged at each side of and engaging the material in coinciding opposition which comprises, impressing a voltage across the electrodes at each side of the material of the same phase to cause current to flow from an electrode at one side of the material to the coinciding electrode at the other side thereof and weld the material directly between the coinciding electrodes, and increasing the reactance of the material between the welds to reduce transverse currents between the electrodes arranged at the same sides of the material.

2. A method of welding two adjacent pieces of material wherein two spaced welding electrodes engage each outer face of the adjacent pieces in coinciding opposition which comprises, impressing a voltage across the electrodes at each side of the material of the same phase to cause current to flow from an electrode at one face of the material through the two pieces to the coinciding electrode at the opposite face of the material and weld the two pieces at spaced points directly between the coinciding electrodes, and maintaining the frequency of the current above 1000 cycles so as to increase the reactance of the two pieces between the weld points and reduce transverse currents between the electrodes arranged on the same faces of the material.

3. A method of welding material wherein two spaced welding electrodes are arranged at each side of and engaging the material in coinciding opposition which comprises, impressing a voltage across the electrodes at each side of the material of the same phase to cause current to flow from an electrode at one side of the material to the coinciding electrode at the other side thereof and weld the material directly between the coinciding electrodes, and inductively increasing the reactance of the material between the welds to diminish transverse currents between the electrodes arranged at the same sides of the material.

4. A method of welding two adjacent sheets of material wherein two spaced welding electrodes engage each outer face of the adjacent sheets in coinciding opposition which comprises, impressing a voltage across the electrodes at each side of the material of the same phase to cause current to flow from an electrode at one face of the material through the two sheets to the coinciding electrode at the opposite face of the material and weld the two sheets at spaced points directly between the coinciding electrodes, maintaining the frequency of the current above 1000 cycles so as to increase the reactance of the two sheets between the weld points and reduce transverse currents between the electrodes arranged on the same faces of the material, and inductively increasing the reactance of the two pieces of sheets between the weld points to further reduce the transverse currents between the electrodes arranged on the same faces of the material.

5. Apparatus for welding two adjacent sheets of material comprising, a pair of spaced welding electrodes engaging each outer face of the sheets in coinciding opposition, an alternating current source having a frequency between one thousand and twenty thousand cycles supplying voltage to said electrodes so as to cause current to flow from an electrode at one face of one sheet to the coinciding electrode engaging the other sheet and weld the two sheets at points directly between the coinciding electrodes, and magnetizable means associated with each pair of electrodes adjacent the outer face of the respective sheet for increasing the reactance of the sheets between the weld points.

6. Apparatus for welding two adjacent sheets of material comprising, a pair of spaced welding electrodes engaging each outer face of the sheets in coinciding opposition, an alternating current source having a frequency between one thousand and twenty thousand cycles supplying voltage to said electrodes so as to cause current to flow from an electrode at one face of one sheet to the coinciding electrode engaging the other sheet and weld the two sheets at points directly between the coinciding electrodes, and electromagnetic means associated with each pair of electrodes adjacent the outer face of the respective sheet for increasing the reactance of the sheets between the weld points.

7. Apparatus for welding two adjacent sheets of material comprising, a pair of spaced welding electrodes engaging each outer face of the sheets in coinciding opposition, an alternating current source having a frequency between one thousand and twenty thousand cycles supplying voltage to said electrodes so as to cause current to flow from an electrode at one face of one sheet to the coinciding electrode engaging the other sheet and weld the two sheets at points directly between the coinciding electrodes, and magnetizable means responsive to the flow of the welding current associated with each pair of electrodes adjacent the outer face of the respective sheet for increasing the reactance of the sheets between the weld points.

GERHARD HAGEDORN.